US012217092B2

(12) United States Patent
Jeong et al.

(10) Patent No.: US 12,217,092 B2
(45) Date of Patent: Feb. 4, 2025

(54) ELECTRONIC DEVICE AND CONTROLLING METHOD OF ELECTRONIC DEVICE

(71) Applicant: SAMSUNG ELECTRONICS CO., LTD., Suwon-si (KR)

(72) Inventors: Hyukjin Jeong, Suwon-si (KR); Jihwan Yeo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 73 days.

(21) Appl. No.: 18/131,629

(22) Filed: Apr. 6, 2023

(65) Prior Publication Data

US 2023/0244534 A1 Aug. 3, 2023

Related U.S. Application Data

(63) Continuation of application No. PCT/KR2022/010428, filed on Jul. 18, 2022.

(30) Foreign Application Priority Data

Jul. 27, 2021 (KR) .................... 10-2021-0098630
Sep. 2, 2021 (KR) .................... 10-2021-0117221

(51) Int. Cl.
G06F 9/44 (2018.01)
G06F 8/41 (2018.01)
(Continued)

(52) U.S. Cl.
CPC .......... *G06F 9/5027* (2013.01); *G06F 8/4441* (2013.01); *G06F 8/453* (2013.01); *G06F 11/3423* (2013.01)

(58) Field of Classification Search
None
See application file for complete search history.

(56) References Cited

U.S. PATENT DOCUMENTS 10,621,486 B2  4/2020 Yao
10,628,295 B2  4/2020 Gu et al.
(Continued)

FOREIGN PATENT DOCUMENTS

CN   111553466 A   8/2020
CN   112116084 A   12/2020
(Continued)

OTHER PUBLICATIONS

Yongming Shen et al., "Escher: A CNN Accelerator with Flexible Buffering to Minimize Off-Chip Transfer", 2017 IEEE 25th Annual International Symposium on Field-Programmable Custom Computing Machines, pp. 93-100.

(Continued)

*Primary Examiner* — Insun Kang
(74) *Attorney, Agent, or Firm* — Sughrue Mion, PLLC

(57) ABSTRACT

An electronic apparatus includes a memory configured to store data corresponding to a neural network model, a neural network accelerator including a buffer configured to temporarily store the data corresponding to the neural network model, and a core configured to perform a computation on the neural network model based on the data stored in the buffer, and a processor configured to determine a plurality of combinations including fused layers and non-fused layers based on a method of selecting and fusing adjacent layers of the neural network model, based on a capacity of the buffer, determine a size of a tile capable of being processed in one computation in the core to acquire feature values output by the fused layers and the non-fused layers, and based on a first memory usage and computation time for storing the feature values in the buffer, determine whether to store the feature values in the memory.

18 Claims, 9 Drawing Sheets

(51) Int. Cl.
*G06F 9/50* (2006.01)
*G06F 11/34* (2006.01)

(56) References Cited

U.S. PATENT DOCUMENTS

| | | | |
|---|---|---|---|
| 11,119,915 | B2 | 9/2021 | Luo et al. |
| 11,176,449 | B1 | 11/2021 | Nez et al. |
| 11,188,327 | B2 | 11/2021 | Gu et al. |
| 12,093,810 | B2 * | 9/2024 | He .................. G06N 3/063 |
| 2019/0196953 | A1 | 6/2019 | Gu et al. |
| 2019/0220734 | A1 | 7/2019 | Ferdman et al. |
| 2019/0243755 | A1 * | 8/2019 | Luo .................. G06N 3/04 |
| 2019/0244091 | A1 | 8/2019 | Weber et al. |
| 2019/0303762 | A1 | 10/2019 | Sui et al. |
| 2020/0218644 | A1 | 7/2020 | Gu et al. |
| 2021/0174177 | A1 | 6/2021 | Yu et al. |
| 2021/0357732 | A1 | 11/2021 | Nez et al. |
| 2022/0027716 | A1 | 1/2022 | Nez et al. |
| 2022/0164187 | A1 | 5/2022 | Gu et al. |
| 2023/0085718 | A1 * | 3/2023 | Yuan .................. G06F 9/5016 706/27 |
| 2024/0220768 | A1 * | 7/2024 | Zhang .................. G06N 5/01 |

FOREIGN PATENT DOCUMENTS

| | | |
|---|---|---|
| CN | 105869117 B | 4/2021 |
| CN | 112711422 A | 4/2021 |
| CN | 115618930 A | 1/2023 |
| JP | 6834097 B1 | 2/2021 |
| KR | 10-2019-0078478 A | 7/2019 |
| KR | 10-2020-0108341 A | 9/2020 |
| KR | 1020210072524 A | 6/2021 |

OTHER PUBLICATIONS

Yu-Hsin Chen et al.,"Eyeriss: An Energy-Efficient Reconfigurable Accelerator for Deep Convolutional Neural Networks", IEEE Journal of Solid-State Circuits, vol. 52, Issue: 1, Jan. 2017, pp. 1-12.
Manoj Alwani et al., "Fused-layer CNN Accelerators", 2016 49th Annual IEEE/ACM International Symposium on Microarchitecture, 12 Pages.
Xuyi Cai et al., "Optimus: Towards Optimal Layer-Fusion on Deep Learning Processors", LCTES 2021, Proceedings of the $22^{nd}$ ACM SIGPLAN/SIGBED International Conference on Languages, Compilers, and Tools for Embedded Systems, pp. 67-79.
Gang Li et al., "Block Convolution: Towards Memory-Efficient Inference of Large-Scale CNNs on FPGA", arXiv:2105.08937v1 [cs.AR], May 19, 2021, 12 Pages.
Sang-Soo Park et al., "CENNA: Cost-Effective Neural Network Accelerator", MDPI Electronics, vol. 9, Issue: 1, Jan. 2020, 19 Pages.
International Search Report (PCT/ISA/210) issued by the International Searching Authority on Oct. 21, 2022 in International Application No. PCT/KR2022/010428.
Written Opinion (PCT/ISA/237) issued by the International Searching Authority on Oct. 21, 2022 in International Application No. PCT/KR2022/010428.
European Extended Search Report issued Aug. 12, 2024 by the European Patent Office for EP Patent Application No. 22849773.1.

* cited by examiner

ELECTRONIC DEVICE AND CONTROLLING METHOD OF ELECTRONIC DEVICE

CROSS-REFERENCE TO RELATED APPLICATIONS

This application is a bypass continuation of International Application No. PCT/KR2022/010428, filed on Jul. 18, 2022, in the Korean Intellectual Property Receiving Office, which is based on and claims priority to Korean Patent Application No. 10-2021-0098630, filed on Jul. 27, 2021 in the Korean Intellectual Property Office, and to Korean Patent Application No. 10-2021-0117221 filed on Sep. 2, 2021, in the Korean Intellectual Property Office, the disclosures of which are incorporated herein by reference in their entireties.

BACKGROUND

1. Field

The disclosure relates to an electronic apparatus and a method for controlling the electronic apparatus. More particularly, the disclosure relates to an electronic apparatus capable of performing a computation on a neural network model using a neural network accelerator and a method for controlling the same.

2. Description of Related Art

In recent years, technologies related to neural network accelerators, which include dedicated hardware for implementing and executing artificial intelligence, have been developed. Particularly, there is a need for a technology to reduce data transmission between a buffer included in the neural network accelerator (e.g., a global buffer) and a memory outside the neural network accelerator (e.g., a main memory) (i.e., to reduce an execution time consumed in off-chip memory transfer).

In a layer-by-layer execution method, which is a method of performing one operation for each of a plurality of layers included in a neural network model, it is possible to reduce data transmission that occurs while performing one layer, but there is a limit in that it is difficult to reduce off-chip memory transfer due to data transmission between several layers when computing a neural network model consisting of several layers.

In a fused layer execution method, which is a method in which successive layers are fused and the next layer uses a computation result of a previous layer as it is without storing the computation result of the previous layer in a main memory in the fused layer, there is a problem that data transmission for an intermediate computation result between the fused layers can only be reduced, and off-chip memory transfer may occur in the data transmission for the computation result between the fused and unfused layers.

SUMMARY

Provided are an electronic apparatus for improving a computational efficiency of a neural network accelerator by minimizing data transmission between a buffer included in the neural network accelerator and a memory outside the neural network accelerator, and a method for controlling the same.

Additional aspects will be set forth in part in the description which follows and, in part, will be apparent from the description, or may be learned by practice of the presented embodiments.

According to an aspect of the disclosure, an electronic apparatus may include a memory configured to store data corresponding to a neural network model, a neural network accelerator including a buffer configured to temporarily store the data corresponding to the neural network model, and a core configured to perform a computation on the neural network model based on the data stored in the buffer, and a processor configured to determine a plurality of combinations including fused layers and non-fused layers based on a method of selecting and fusing adjacent layers of the neural network model, based on a capacity of the buffer, determine a size of a tile capable of being processed in one computation in the core to acquire feature values output by the fused layers and the non-fused layers, based on a first memory usage and computation time for storing the feature values in the buffer, determine whether to store the feature values in the memory, based on determining to store the feature values in the memory, identify a first combination among the plurality of combinations to be used in a computation of the neural network model by calculating a data transmission time between the buffer and the memory, and calculating a computation time of the core.

The fused layers may include a first layer and a second layer adjacent to the first layer, a first feature value output by the first layer may be configured to be stored in the buffer and input to the second layer without storing in the memory, a second feature value output by the second layer may be configured to be acquired based on the first feature value, based on the second feature value being determined not to be stored in the memory, the second feature value may be configured to be stored in the buffer and input to a third layer, based on the second feature value being determined to be stored in the memory, the second feature value may be configured to be stored in the memory and input to the third layer.

The size of the tile and a data size of the second feature value may be configured to be determined according to a number of rows, a number of columns, a depth of a matrix representing the tile and the second feature value.

The processor may be further configured to determine, based on a second memory usage corresponding to the data size of the second feature value being less than a size of the buffer, the size of the tile to correspond to the data size of the second feature value, and determine, based on the second memory usage corresponding to the data size of the second feature value being greater than the size of the buffer, the size of the tile to a size less than the data size of the second feature value.

The processor may be further configured to determine whether to store the second feature value in the buffer or not to store the second feature value in the memory, based on the second feature value being stored in the buffer, based on a third memory usage required to perform a computation of the second layer being less than a remaining capacity of the buffer, based on a fourth memory usage required to perform a computation of each of at least one layer using the second feature value being less than the remaining capacity of the buffer, and based on a computation time for acquiring the second feature value being less than the second feature value being stored in the memory.

The processor may be further configured to identify the first combination as a combination in which a sum of the data transmission time between the buffer and the memory, and the computation time of the core among the plurality of combinations is a minimum.

The processor may be further configured to convert data with respect to the neural network model into a first graph of a predetermined form, convert the first graph into a second graph corresponding to the first combination, and based on the second graph, generate a code in which data with respect to the neural network model can be processed in the neural network accelerator.

According to an aspect of the disclosure, a method for controlling an electronic apparatus including a memory configured to store data corresponding to a neural network model, and a neural network accelerator including a buffer configured to temporarily store the data corresponding to the neural network model and a core configured to perform a computation on the neural network model based on the data stored in the buffer, may include determining a plurality of combinations including fused layers and non-fused layers based on a method of selecting and fusing adjacent layers of the neural network model, based on a capacity of the buffer, determining a size of a tile capable of being processed in one computation in the core to acquire feature values output by the fused layers and the non-fused layers, based on a first memory usage and computation time for storing the feature values in the buffer, determining whether to store the feature values in the memory, and based on determining to store the feature values in the memory, identifying a first combination among the plurality of combinations to be used in a computation of the neural network model by calculating a data transmission time between the buffer and the memory, and calculating a computation time of the core according to the plurality of combinations.

The fused layers may include a first layer and a second layer adjacent to the first layer, a first feature value output by the first layer may be configured to be stored in the buffer and input to the second layer without storing in the memory, a second feature value output by the second layer may be configured to be acquired based on the first feature value, based on the second feature value being determined not to be stored in the memory, the second feature value may be configured to be stored in the buffer and input to a third layer, based on the second feature value being determined to be stored in the memory, the second feature value may be configured to be stored in the memory and input to the third layer.

The size of the tile and a data size of the second feature value may be configured to be determined according to a number of rows, a number of columns, a depth of a matrix representing the tile and the second feature value.

Determining the size of the tile may include determining, based on a second memory usage corresponding to the data size of the second feature value being less than a size of the buffer, the size of the tile to correspond to the data size of the second feature value, and determining, based on the second memory usage corresponding to the data size of the second feature value being greater than the size of the buffer, the size of the tile to a size less than the data size of the second feature value.

The determining whether to store the feature value in the memory may include determining whether to store the second feature value in the buffer or not to store the second feature value in the memory, based on the second feature value being stored in the buffer, based on a third memory usage required to perform a computation of the second layer being less than a remaining capacity of the buffer, based on a fourth memory usage required to perform a computation of each of at least one layer using the second feature value being less than the remaining capacity of the buffer, and based on a computation time for acquiring the second feature value being less than the second feature value being stored in the memory.

The identifying the first combination may include identifying the first combination as a combination in which a sum of the data transmission time between the buffer and the memory, and the computation time of the core among the plurality of combinations is a minimum.

The method may include converting data with respect to the neural network model into a first graph of a predetermined form, converting the first graph into a second graph corresponding to the first combination, and based on the second graph, generating a code in which data with respect to the neural network model can be processed in the neural network accelerator.

According to an aspect of the disclosure, a non-transitory computer-readable storage medium may store instructions that, when executed by a processor of an electronic apparatus, the electronic apparatus including a memory configured to store data corresponding to a neural network model and a neural network accelerator including a buffer configured to temporarily store the data corresponding to the neural network model and a core configured to perform a computation on the neural network model based on the data stored in the buffer, cause the processor to determine a plurality of combinations including fused layers and non-fused layers based on a method of selecting and fusing adjacent layers of the neural network model, based on a capacity of the buffer, determine a size of a tile capable of being processed in one computation in the core to acquire feature values output by the fused layers and the non-fused layers, based on a first memory usage and computation time for storing the feature values in the buffer, determine whether to store the feature values in the memory, and based on determining to store the feature values in the memory, identify a first combination among the plurality of combinations to be used in a computation of the neural network model by calculating a data transmission time between the buffer and the memory, and calculating a computation time of the core according to the plurality of combinations.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
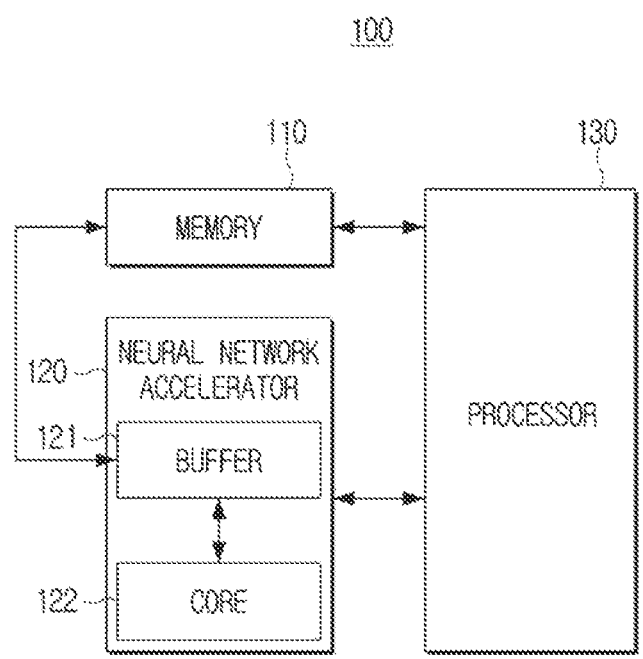
FIG. 1 is a block diagram illustrating a configuration of an electronic apparatus according to an example embodiment.

The disclosure may have several embodiments, and the embodiments may be modified variously. In the following description, specific embodiments are provided with accompanying drawings and detailed descriptions thereof. However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements.

In describing exemplary embodiments, detailed description of relevant known functions or components may be omitted if it would obscure the description of the subject matter.

In addition, the exemplary embodiments may be changed in various forms, and therefore, the technical scope is not limited to the following exemplary embodiments. Rather, these exemplary embodiments are provided to make the disclosure thorough and complete.

The terms used herein are solely intended to explain a specific exemplary embodiment, and not to limit the scope of the disclosure. Singular forms are intended to include plural forms unless the context clearly indicates otherwise.

Singular forms are intended to include plural forms unless the context clearly indicates otherwise. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

The expression "1", "2", "first", or "second" as used herein may modify a variety of elements, irrespective of order and/or importance thereof, and only to distinguish one element from another. Accordingly, without limiting the corresponding elements.

When an element (e.g., a first element) is "operatively or communicatively coupled with/to" or "connected to" another element (e.g., a second element), an element may be directly coupled with another element or may be coupled through the other element (e.g., a third element).

On the other hand, when an element (e.g., a first element) is "directly coupled with/to" or "directly connected to" another element (e.g., a second element), an element (e.g., a third element) may not be existed between the other element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level.

Under certain circumstances, the term "device configured to" may refer to "device capable of" doing something together with another device or components. For example, the term "processor configured (or configured to perform) A, B, and C" may refer to a processor (e.g., an embedded processor) dedicated to performing the operations, or may refer to a generic-purpose processor (e.g., a central processing unit (CPU) or an application processor (AP)) capable of performing corresponding operations by executing one or more software programs stored in a memory device.

In the embodiments disclosed herein, a term 'module' or 'unit' may refer to an element that performs at least one function or operation. The 'module' or 'unit' may be realized as hardware, software, or combinations thereof. In addition, a plurality of 'modules' or 'units' may be integrated into at least one module and may be realized as at least one processor in an integrated manner except for 'modules' or 'units' that should be realized in specific hardware.

Further, various elements and areas in the drawings are schematically drawn. Therefore, the technical ideas are not limited by a relative size or interval drawn in the accompanying drawings.

The example embodiments of the disclosure will be described in greater detail below in a manner that will be understood by one of ordinary skill in the art.

Figure 2:
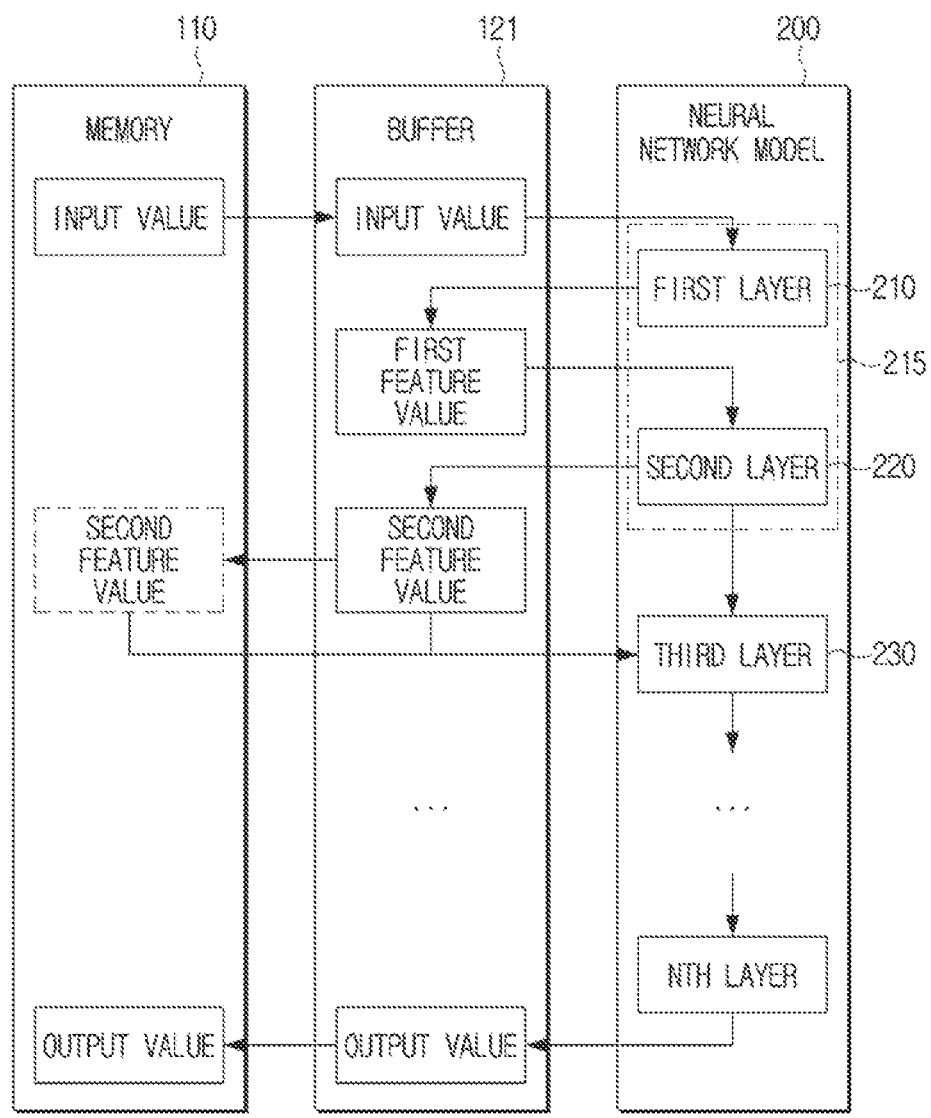
FIG. 2 is a diagram illustrating a neural network model computation process performed using data stored in a memory and a buffer together with a structure of the neural network model according to an example embodiment.

FIG. 1 is a block diagram illustrating a configuration of an electronic apparatus 100 according to an example embodiment. FIG. 2 is a diagram illustrating a neural network model computation process performed using data stored in a memory 110 and a buffer 121 together with a structure of the neural network model according to an embodiment. Hereinafter, various example embodiments of the disclosure will be described with reference to FIGS. 1 and 2.

As shown in FIG. 1, the electronic apparatus 100 according to an embodiment of the disclosure may include a memory 110, a neural network accelerator 120, and a processor 130, and the neural network accelerator 120 may include a buffer 121 and a core 122.

The electronic apparatus 100 according to the disclosure may refer to an apparatus capable of performing a computation on a neural network model using the neural network accelerator 120. There is no particular limitation on the type of the electronic apparatus 100 according to the disclosure, and any device capable of performing a computation on a neural network model using the neural network accelerator 120 may correspond to the electronic apparatus 100 according to the disclosure.

The neural network model according to the disclosure may refer to an artificial intelligence (AI) model including a neural network, and may be learned by deep learning. The neural network model may be of types such as an object recognition model, an automatic speech recognition model, a speech synthesis model, or the like, but the neural network model according to the disclosure is limited to the embodiment described above.

The type of neural network included in the neural network model according to the disclosure is also not limited to a specific type. The neural network model according to the disclosure may include various types of neural networks such as a deep neural network (DNN), a convolutional neural network (CNN), a recurrent neural network (RNN), a generative adversarial network (GAN), or the like. Also, the neural network model according to the disclosure may be implemented in the form of an on-device included in the electronic apparatus 100, and may also be included in an external device connected to the electronic apparatus 100.

At least one instruction related to the electronic apparatus 100 may be stored in the memory 110. In addition, an operating system (O/S) for driving the electronic apparatus 100 may be stored in the memory 110. In addition, various software programs or applications for operating the electronic apparatus 100 according to various embodiments of the disclosure may be stored in the memory 110. In addition, the memory 110 may include a semiconductor memory such as a flash memory or a magnetic storage medium such as a hard disk.

Specifically, various software modules for operating the electronic apparatus 100 may be stored in the memory 110 according to various embodiments of the disclosure, and the processor 130 may execute various software modules stored in the memory 110 to control the operation of the electronic apparatus. The memory 110 may be accessed by the processor 130, and perform readout, recording, correction, deletion, update, or the like, on data by the processor 130.

According to an embodiment of the disclosure, the term of the memory 110 may include the memory 110, read-only memory (ROM) and random access memory (RAM) within the processor 130, and a memory card attached to the electronic apparatus 100 (e.g., micro secure digital (SD) card or memory stick).

Particularly, according to various embodiments of the disclosure, data for a neural network model may be stored in the memory 110. Here, the data with respect to the neural network model may include information on a plurality of layers constituting the neural network model, information on weights and biases corresponding to each of the plurality of layers, input data input to the neural network model, information on output data output by the neural network model, or the like.

In addition, the memory 110 may store various information such as information on a plurality of combinations including fused layers and non-fused layers, information on a size of tiles for each of the plurality of layers, usage and computation time of the memory 110, information on a data transmission time between the buffer 121 and the memory 110.

In addition, various information necessary within the scope for achieving an object of the disclosure may be stored in the memory 110, and the information stored in the memory 110 may be updated as it is received from an external device or input by the user.

The neural network accelerator 120 may refer to dedicated hardware for implementing and executing artificial intelligence, and may also be referred to as an AI accelerator or AI chipsets. For example, the neural network accelerator 120 may be a graphics processing unit (GPU), a CPU, a field programmable gate array (FPGA), an application-specific integrated circuit (ASIC), or a system on chip (SoC) based neural network accelerator 120, but is not limited thereto.

As illustrated in FIG. 1, the neural network accelerator 120 may include a buffer 121 and a core 122. FIG. 1 illustrates a case there is one buffer 121 and one core 122, respectively, this is only an exemplary embodiment, and a plurality of the buffers 121 and the core 122 may be implemented, respectively.

The buffer 121 may temporarily store data with respect to the neural network model. Specifically, data necessary for the core 122 to perform a computation among data with respect to the neural network model may be temporarily stored in the buffer 121, and data according to a computation result of the core 122 may be temporarily stored before being saved in the memory 110. Accordingly, a capacity of the buffer 121 may be less than a capacity of the memory 110. The buffer 121 may be referred to as a global buffer, while the memory 110 may be referred to as a main memory 110 in order to distinguish it from the buffer 121.

The core 122 may perform a computation on the neural network model based on data stored in the buffer 121. Specifically, the core 122 may read input value and weight, which are information necessary for the computation, from the buffer 121, perform the computation using the input value and the weight, and perform a process of writing an output value according to a result of the computation to the buffer 121.

As described above, data movement may occur between the buffer 121 and the memory 110 in the process of reading and writing data. For example, when data required for a computation does not exist in the buffer 121, it may be transferred from the memory 110 to the buffer 121, and when it is required to empty a capacity of the buffer 121 for the next computation after the core 122 performs a specific computation, data stored in the buffer 121 may be transmitted to the memory 110.

The data movement between the buffer 121 and the memory 110 may be referred to as off-chip memory transfer, as distinguished from on-chip memory transfer that is data movement between the buffer 121 and the core 122, and it accounts for a very large part of the execution time of the neural network accelerator 120. For example, in case of various types of existing CNN accelerators, about 71% of a total execution time may be consumed on average for off-chip memory transfer. And, according to various embodiments of the disclosure as will be described below, the off-chip memory transfer of the neural network accelerator 120 may be significantly reduced.

The processor 130 controls the overall operation of the electronic apparatus 100. Specifically, the processor 130 may be connected to the configuration of the electronic apparatus 100 including the memory 110 and the neural network accelerator 120, and execute at least one instruction stored in the memory 110, thereby controlling the overall operation of the electronic apparatus 100.

The processor 130 may be realized in various methods. For example, the processor 130 may be at least one of a processor, an ASIC, an embedded processor, a microprocessor, hardware control logic, hardware Finite State Machine (FSM), and a Digital Signal Processor (DSP). The term processor 130 may be used to include a CPU, a GPU, a main processing unit (MPU), or the like.

Particularly, in various embodiments according to the disclosure, the processor 130 may reduce off-chip memory transfer by identifying an optimal combination among a plurality of combinations according to a fusion of adjacent layers of the neural network model, and a control process by the processor 130 according to the disclosure will be described in detail.

The processor 130 may determine a plurality of combinations including fused layers and non-fused layers based on a method of selecting and fusing some of the adjacent layers of the neural network model.

Here, the fusion of layers may refer to a technique of treating and computing adjacently connected layers among a plurality of layers included in the neural network model as if they were one layer. Specifically, when two layers are fused, a computation result of a first layer may not be stored in the memory 110 but may be used by the next layer while stored in the buffer 121.

For example, referring to FIG. 2, the neural network model 200 according to the disclosure may include a first layer 210, a second layer 220 connected adjacent to the second layer, and a third layer 230 connected adjacent to the second layer 220. Here, the first layer 210 and the second layer 220 may be fused layers, and the third layer 230 may be a non-fused layer. A dotted line 215 of FIG. 2 is to indicate that the first layer 210 and the second layer 220 are fused layers.

When the first layer 210 and the second layer 220 are fused, as shown in FIG. 2, a first feature value output by the first layer 210 may be stored in the buffer 121 and may be input to the second layer 220 without being stored in the memory 110. When the first feature value is input to the second layer 220, the second layer 220 may acquire a second feature value based on the first feature value. Whether the second feature value acquired by the second layer 220 is stored in the buffer 121 and then stored in the memory 110 will be described below.

In the above description, it is assumed that the first layer 210 and the second layer 220 are fused and the third layer 230 is not fused among the plurality of layers. The second layer 220 and the third layer 230 may be fused and the first layer 210 may not be fused. Which layers among the plurality of layers are fused and which layers are not may be determined in various ways according to a method of selecting and fusing some of adjacent layers of the neural network model. As described above, a plurality of combinations including fused layers and unfused layers may be determined according to a method of selecting and fusing some of the adjacent layers of the neural network model may be referred to as a so-called candidate partition process.

The processor 130 may determine a size of a tile that can be processed in one computation in the core 122 according to a plurality of combinations to acquire a feature value output by each of the fused layers and the non-fused layers, based on a capacity of the buffer 121.

Here, the tile may refer to a computation unit that can be processed in one computation in the core 122 to acquire a feature value. Specifically, when the size of the buffer 121 is limited and thus feature values of the layers cannot be computed at once, the processor 130 may divide the feature values into tile units, compute each of the feature values, and sum results of the computation for each tile to acquire a final feature value. For example, a size of the tile may be determined according to the number of rows, the number of columns, and a depth of a matrix representing the tile, and a data size of the feature value may also be determined according to the number of rows, the number of columns, and a depth of a matrix representing the feature value.

As shown in FIG. 2, when the first layer 210 and the second layer 220 are fused, when the memory usage corresponding to a data size of the second feature value is less than a size of the buffer 121, the processor 130 may determine a size of a tile to correspond to the data size of the second feature value. When the entire second feature value can be processed by the buffer 121, the processor 130 may determine the size of the tile as a size corresponding to the data size of the second feature value. For example, when the data size of the second feature value corresponds to a 9×9×9 matrix and a computation process for acquiring the second feature value of the 9×9×9 matrix can be performed by the buffer 121, the size of the tile may be determined as 9×9×9.

When the memory usage corresponding to the data size of the second feature value is greater than the size of the buffer 121, the processor 130 may determine the size of the tile to be less than the data size of the second feature value. If the entire second feature value cannot be processed by the buffer 121, the processor 130 may reduce the size of the tile to a size less than the data size of the second feature value. For example, if the data size of the second feature value corresponds to the 9×9×9 matrix and the computation process for acquiring the second feature value of the 9×9×9 matrix cannot be performed by the buffer 121, the size of the tile may be determined as 3×3×3 less than the 9×9×9.

The process of determining the size of a tile based on the capacity of the buffer 121 may be referred to as a so-called tiling process, and various embodiments of the tiling process will be described in more detail with reference to FIG. 3.

The processor 130 may determine whether to store each feature value in the memory 110 according to the plurality of combinations based on the memory usage and a computation time in case of storing each feature value of each of the fused layers and the non-fused layers in the buffer 121.

Specifically, in each of the plurality of combinations according to the disclosure, the processor 130 may determine whether to store feature values of the fused layers and the non-fused layers in the buffer 121 to be used immediately in the next layer, or store them in the memory 110 and reloaded be used in the next layer.

As an example, when the first layer 210 and the second layer 220 are fused as shown in FIG. 2, assuming that the second feature value is stored in the buffer 121, first, if a memory usage 110 to perform a computation of the second layer 220 is less than a remaining capacity of the buffer 121, second, if the memory usage 110 to perform each computation of at least one layer using the second feature value is less than the remaining capacity of the buffer 121, and third, if a computation time for acquiring the second feature value is less than a case when the second feature value is stored in the memory 110, the processor 130 may determine that the second feature value is stored in the buffer 121 and not stored in the memory 110.

If it is determined not to store the second feature value in the memory 110, the second feature value may be stored in the buffer 121 and then input to the third layer 230. If it is determined to store the second feature value in the memory 110, the second feature value may be stored in the memory 110 and input to the third layer 230. The second feature value of the memory 110 is indicated by a dotted line in FIG. 2, since the second feature value may be stored in the memory 110 only when it is determined to be stored in the memory 110.

A process of storing the feature value in the buffer 121 and using it immediately in the next layer may be referred to as caching, and a method of determining whether to cache according to the disclosure will be described in more detail with reference to FIG. 4.

If adjacent layers of a neural network model are fused, off-chip memory transfer for intermediate computation results between fused layers may be reduced, but there is a limit that data transmission with respect to the computation results between fused and unfused layers can be reduced. Accordingly, the processor 130 may store the computation results of the fused layers and the non-fused layers in the buffer 121 without transmitting them to the memory 110.

However, as the computation results of the fused and non-fused layers are stored in the buffer 121, the capacity of the buffer 121 is limited, and accordingly, the size of the tile for performing the computation of each layer may be reduced. Accordingly, in determining whether to store the feature values of the fused and non-fused layers in the buffer 121 instead of in the memory 110, the size of the tile for performing the computation of each layer may be required to be considered together.

The result of layer fusion may affect caching, and the result of caching may also affect layer fusion, and thus the processor 130 may perform a fusion process, a tiling process, and a caching process according to the disclosure, and identify an optimal combination by calculating a cost consumed according to the plurality of combinations, that is an execution time.

In an embodiment, the processor 130 may, based on whether to store the size of the tile and each feature value determined as described above in the memory 110, identify a combination to be used for computation of the neural network model among a plurality of combinations by calculating the data transmission time between the buffer 121 and the memory 110 and the computation time of the core 122 for each of the plurality of combinations. Hereinafter, a combination to be used for computation of a neural network model among a plurality of combinations may be briefly referred to as an "optimal combination".

Specifically, when the size of the tile and whether to cache the feature value for each of the plurality of layers are determined for each of the plurality of combinations according to the disclosure, the processor 130 may calculate a data transmission time (i.e., off-chip memory transfer) between the buffer 121 and the memory 110 for each of the plurality of combinations and a computation time of the core 122. In addition, the processor 130 may identify a combination in which a sum of the data transmission time between the buffer 121 and the memory 110 and the computation time of the core 122 is a minimum among the plurality of combinations as the optimal combination.

According to the embodiment of the disclosure as described above, the electronic apparatus 100 may minimize data transmission between the buffer 121 included in the neural network accelerator 120 and the memory 110 external to the neural network accelerator 120, thereby remarkably improving a computational efficiency of the accelerator 120.

Figure 3:
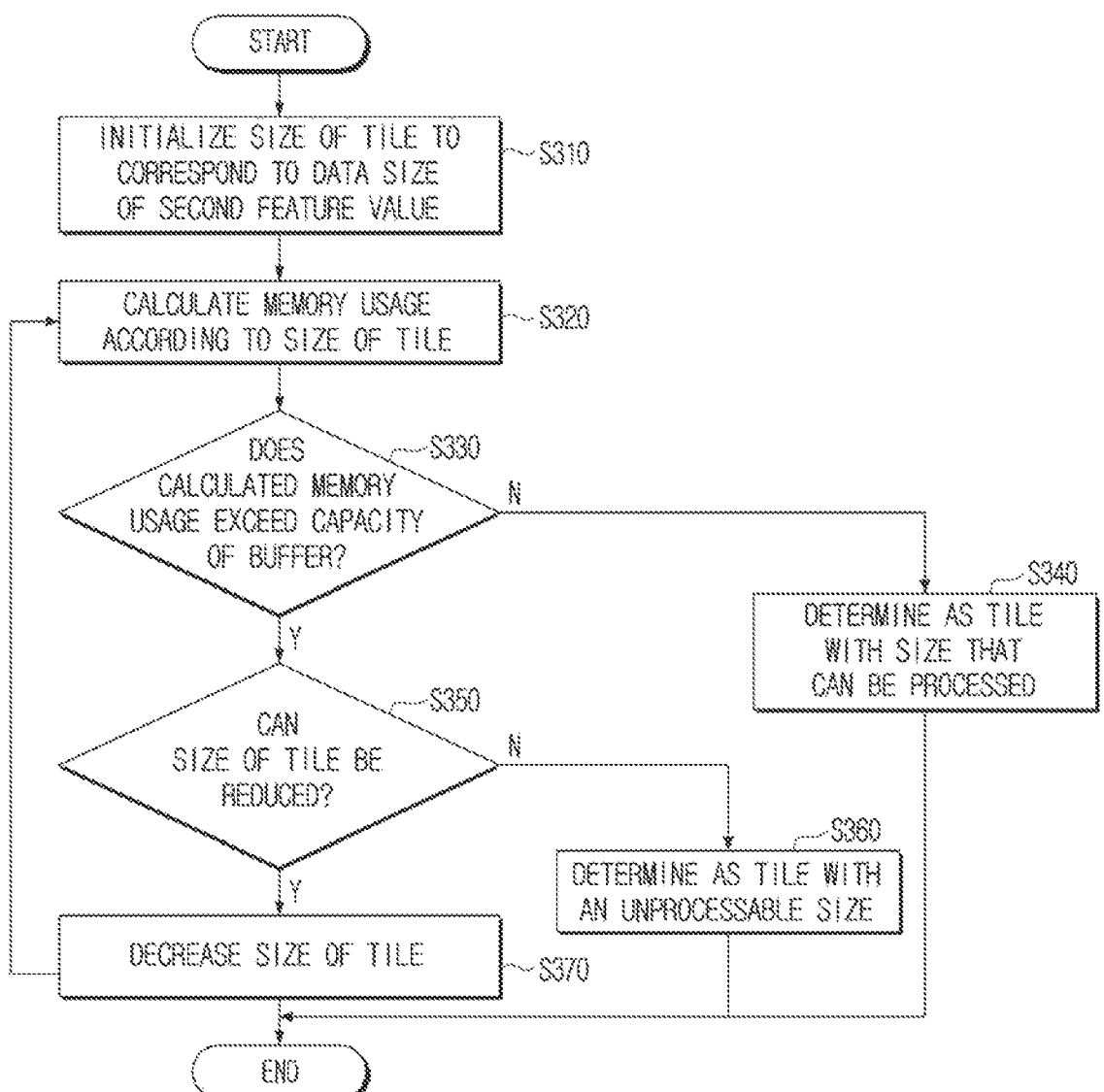
FIG. 3 is a flowchart illustrating in detail a process of determining a size of a tile according to an example embodiment.

FIG. 3 is a flowchart illustrating in detail a process of determining a size of a tile according to an example embodiment.

In the description of FIG. 3, as in the example of FIG. 2, it is assumed that the neural network model according to the disclosure includes a first layer, a second layer connected adjacent to the second layer, and a third layer connected adjacent to the second layer, and the first layer and the second layer are fused. Hereinafter, a process of determining a size of a tile corresponding to the second layer among the plurality of layers will be described with reference to FIG. 3, but the same process may be applied to the other layers.

As shown in FIG. 3, in operation S310, the processor 130 may initialize the size of the tile corresponding to the second layer to correspond to the data size of the second feature value. Specifically, since the processor 130 may set the size of the tile and determine whether the size of the set tile is appropriate, initially, the processor 130 may set the size of the tile to correspond to the data size of the second feature value. For example, the processor 130 may initialize the size of the tile to correspond to the number of rows, the number of columns, and a depth of a matrix representing the second feature value.

When the size of the tile is set, in operation S320, the processor 130 may calculate the memory usage 110 according to the set size of the tile. The processor 130 may calculate a footprint of the memory 110 for performing a computation according to the set size of the tile.

When the memory usage is calculated according to the size of the tile, in operation S330, the processor 130 may identify whether the calculated memory usage exceeds a capacity of the buffer 121.

When the calculated memory usage exceeds the capacity of the buffer 121 (S330—Y), in operation S340, the processor 130 may determine the set tile (i.e., a tile that is a computation target of the memory usage) is a tile with a size that can be processed. If the capacity of the buffer 121 is sufficient compared to the memory footprint for performing a computation according to the size of the set tile, the processor 130 may determine the size of the corresponding tile as the size of the tile for acquiring the second feature value corresponding to the second layer.

If the calculated memory usage does not exceed the capacity of the buffer 121 (S330—Y), in operation S350, the processor 130 may identify whether the size of the set tile can be reduced. If the capacity of the buffer 121 is not sufficient compared to the memory footprint for performing a computation according to the size of the set tile, the processor 130 may reset the size of the tile by reducing the size of the tile in order to reduce the memory footprint.

Here, reducing the size of the tile may mean reducing at least one of the number of rows, the number of columns, and the depth of the matrix representing the tile, and this may mean a case in which the number of rows, the number of columns, and the depth of the matrix are all 1 (i.e., 1×1×1).

If it is determined that the size of the set tile cannot be reduced (S350—N), in operation S360, the processor 130 may determine that the set tile is a tile with an unprocessable size. If it is identified that the size of the set tile can be reduced (S350—N), in operation S370, the processor 130 may decrease the size of the set tile. For example, when the size of the set tile corresponds to a 9×9×9 matrix, the processor 130 may reduce the size of the set tile to 3×3×3, 9×9×3, or the like.

When the size of the tile is reset as the size of the tile is reduced, the processor 130 may calculate the memory usage according to the reset size of the tile (i.e., return to operation S320), and repeat the process of FIG. 3 with a method of identifying whether the calculated memory usage exceeds the capacity of the buffer 121. Also, the processor 130 may repeat and perform the tiling process of FIG. 3 for all layers for a candidate partition, that is, each of the plurality of combinations according to the disclosure.

Figure 4:
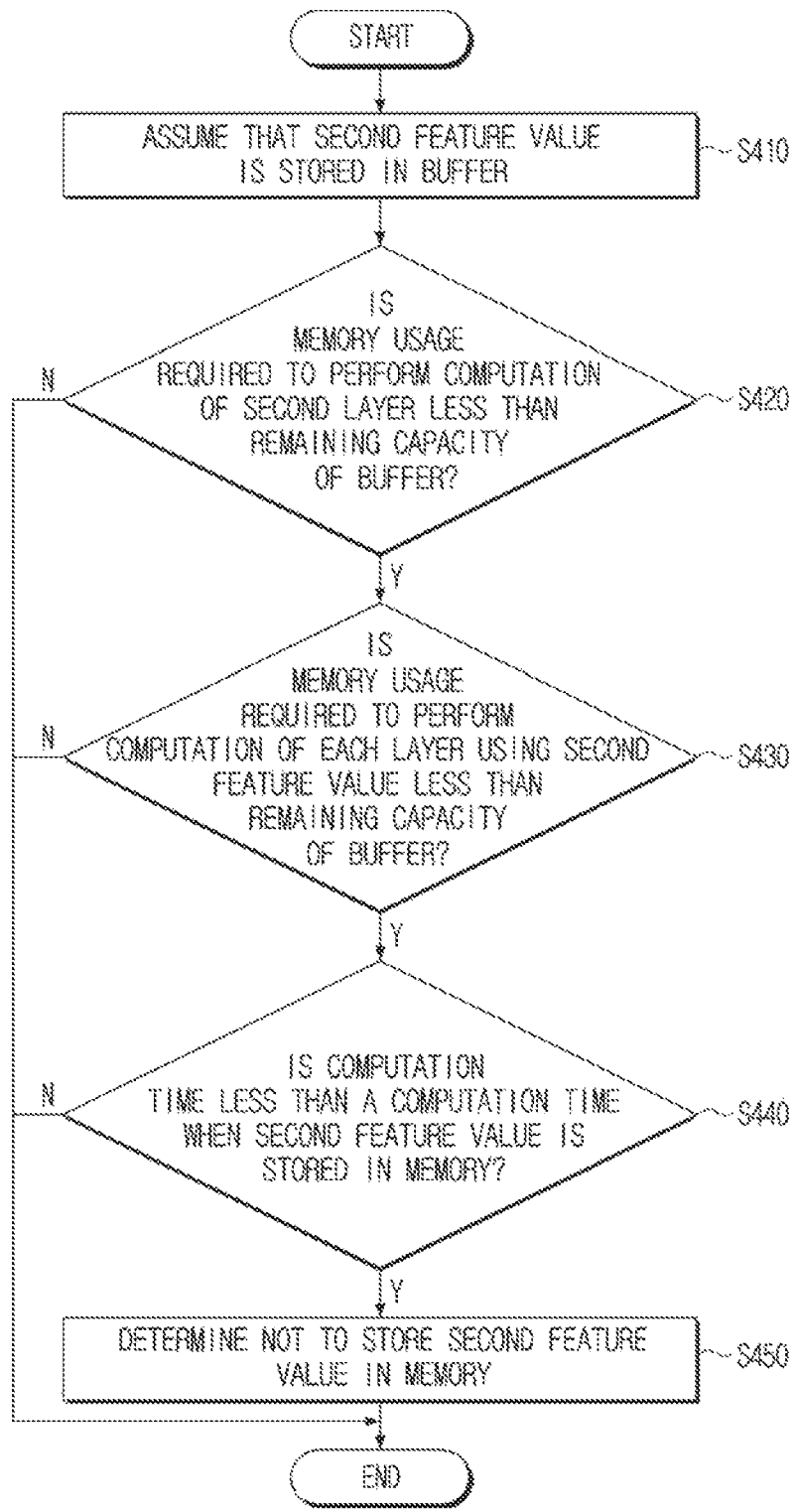
FIG. 4 is a flowchart illustrating in detail a process of determining whether to cache a feature value according to an example embodiment.

FIG. 4 is a flowchart illustrating in detail a process of determining whether to cache a feature value according to an example embodiment.

In the description of FIG. 4, as in the example of FIG. 2, it is assumed that the neural network model according to the disclosure includes a first layer, a second layer connected adjacent to the second layer, and a third layer connected adjacent to the second layer, and the first layer and the second layer are fused.

The processor 130 may sort the fused layers and the non-fused layers according to the plurality of combinations. Specifically, the processor 130 may perform so-called topological sorting, sort the fused layers and the unfused layers according to the performance order, and determine whether to cache feature values of each layer by a method of sequentially visiting according to the sorted order.

Hereinafter, with reference to FIG. 4, only a process of determining whether to cache the second feature value output by the second layer will be described on the assumption that the tiling process as described above in FIG. 3 is performed, but the entire process of determining whether to cache may be performed through a process of sequentially determining whether to cache each feature value according to the sorted order as described above.

As shown in FIG. 4, in operation S410, the processor 130 may assume that the second feature value is stored in the buffer 121. Accordingly, the processor 130 may calculate a remaining capacity of the buffer 121 on the assumption that the second feature value is stored in the buffer 121. Thereafter, the processor 130 may determine whether to cache the second feature value according to whether the following three conditions are satisfied.

In operation S420, the processor 130 may identify whether the memory usage required to perform a computation of the second layer is less than the remaining capacity of the buffer 121. When the second feature value is stored in the buffer 121, the processor 130 may identify whether the computation process of the second layer can be performed based on the remaining capacity of the buffer 121.

In operation S430, the processor 130 may identify whether the memory usage required to perform the computation of each layer using the second feature value is less than the remaining capacity of the buffer 121. When the processor 130 stores the second feature value in the buffer 121, it may be identified whether the computation process of all layers using the second feature value as an input value can be performed, based on the remaining capacity of the buffer 121.

In operation S440, the processor 130 may identify whether a computation time is less than a computation time when the second feature value is stored in the memory 110. The processor 130 may compare a data transmission time and a computation time of the core 122 when the second feature value is stored in the buffer 121, with a data transmission time and a computation time of the core 122 when the second feature value is stored in the memory 110 to identify whether a cost when the second feature value is stored in the buffer 121 is less than a benefit.

When all three conditions as described above are satisfied (S420-Y, S430-Y, S440—Y), in operation S450, the processor 130 may determine not to store the second feature value in the memory 110. When all three conditions are satisfied, the second feature value may be cached in the buffer 121 and not stored in the memory 110. In this case, the second feature value may be directly input to the third layer from the buffer 121.

If any one of the three conditions as described above is not satisfied (S420—N, S430—N, and S440—N), the processor 130 may determine to store the second feature value in the memory 110. If at least one of the three conditions is not satisfied, the second feature value may be stored in the buffer 121 and then stored in the memory 110, and thereafter, a process that the second feature value stored in the memory 110 is transmitted to the buffer 121 may be involved during the computation process.

In the above description, it has been described that the second feature value is not stored in the memory 110 only when all three conditions as described above are satisfied, but this is only an embodiment, and even when one or two of the three conditions as described above are satisfied, the second feature value may be implemented to be cached in the buffer 121.

Figure 5:
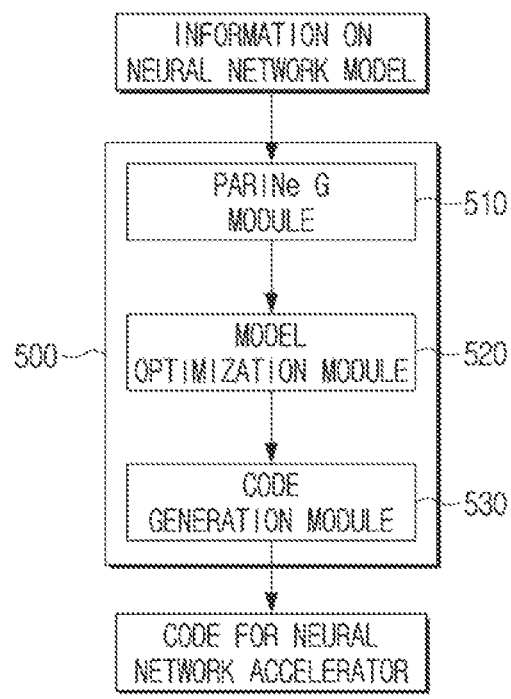
FIG. 5 is a block diagram illustrating an embodiment in which a model optimization module is implemented in a neural processing unit (NPU) compiler according to an example embodiment.
Figure 6:
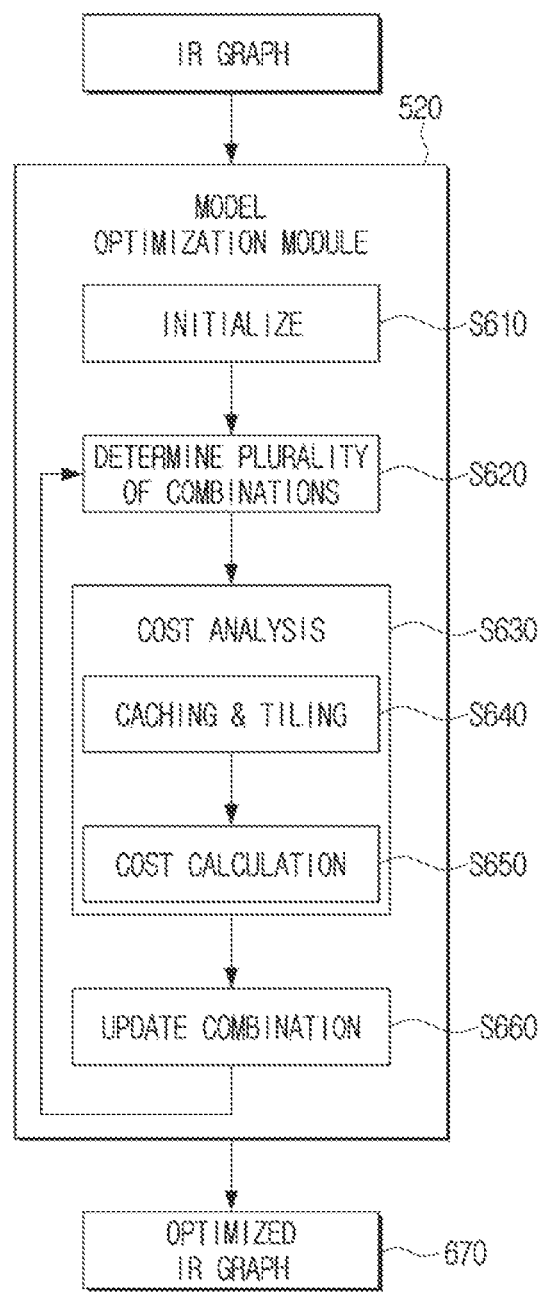
FIG. 6 is a diagram illustrating in detail an operation when a model optimization module is implemented in a NPU compiler according to an example embodiment.

FIG. 5 is a block diagram illustrating an embodiment in which a model optimization module 520 according to an example embodiment of the disclosure is implemented in a neural processing unit (NPU) compiler 500. FIG. 6 is a diagram illustrating in detail an operation when a model optimization module 520 is implemented in a NPU compiler 500 according to an example embodiment The embodiment of the disclosure as described above with reference to FIGS. 1 to 4 may be performed by a module that may be referred to as the model optimization module 520, and the model optimization module 520 may be implemented with one component of the NPU compiler 500.

The NPU compiler 500 may refer to a configuration that converts information about a neural network model into a code that can be processed by the neural network accelerator 120. Specifically, the NPU compiler 500 may perform a series of processes of converting a neural network represented by a directed acyclic graph into a hardware instruction set. The NPU compiler 500 may include a parsing module 510 and a code generation module 530, particularly, the NPU compiler 500 according to the disclosure may include the model optimization module 520 together with the parsing module 510 and the code generation module 530.

The parsing module 510 may refer to a module capable of converting information about a neural network model into an intermediate representation (IR) graph in the form of a directed graph. Here, a node of the IR graph may refer to a layer, and an edge may refer to a data dependency between layers. Each layer may include information such as a type (e.g., convolution, max pool) and weights and biases required for a corresponding computation.

The model optimization module 520 may refer to a module capable of acquiring an IR graph in which off-chip memory transfer is minimized by optimizing the IR graph acquired through the parsing module 510. Specifically, an optimization process according to the model optimization module 520 may be performed as shown in FIG. 6.

Specifically, in operation S610, the model optimization module 520 may perform an initialization process. Here, the initialization process may refer to a process of generating a combination in which all layers of the neural network model are not fused.

When the initialization process is performed, in operation S620, the processor 130 may determine a plurality of combinations. Specifically, the processor 130 may determine a plurality of combinations based on a method of selecting and fusing some of adjacent layers of the neural network model. The processor 130 may identify all cases in which adjacent layers of the neural network model can be fused, and determine a plurality of combinations according to each case.

When a plurality of combinations are determined, in operation S630, the processor 130 may perform a cost analysis process. Specifically, in operation S640, the processor 130 may perform a tiling process and a caching process according to the disclosure and, in operation S650, perform a cost computation process to analyze the cost for each of the plurality of combinations. Here, the cost computation process may refer to a process of calculating an execution time consumed by each of the plurality of combinations after performing the tiling process and the caching process as described with reference to FIG. 1. Since the tiling process and the caching process have been described above with reference to FIGS. 3 and 4, a redundant description of the same content will be omitted.

When the cost analysis process is performed, in operation S660, the processor 130 may perform a combination update process. Specifically, the processor 130 may repeat the process of updating the optimal combination with the lowest cost combination among the plurality of combinations to identify an optimal combination among the plurality of combinations.

As described above, the model optimization module 520 may identify the optimal combination by repeating the process of starting from a combination in which all layers of the neural network model are not fused and updating the adjacent layers to a better combination as the adjacent layers are fused. Accordingly, the model optimization module 520 may output an optimal IR graph 670 in which off-chip memory transfer is minimized based on the input IR graph.

The code generation module 530 may refer to a module capable of generating a code that can be processed by the neural network accelerator 120 based on the optimal IR graph 670 acquired through the model optimization module 520. Here, the code may be in the form of a binary file. In addition, the code generation module 530 may perform a schedule process for designating the order of computations and an allocation process for determining which location in the buffer 121 to allocate data.

According to the embodiment described above with reference to FIGS. 5 and 6, the electronic apparatus 100 may apply the optimization process according to the disclosure to the process of converting information on the neural network model into a code that can be processed by the neural network accelerator 120, thereby remarkably improving a computational efficiency of the neural network accelerator 120 by minimizing data transmission between the buffer 121 included in the neural network accelerator 120 and the memory 110 outside the neural network accelerator.

Figure 7:
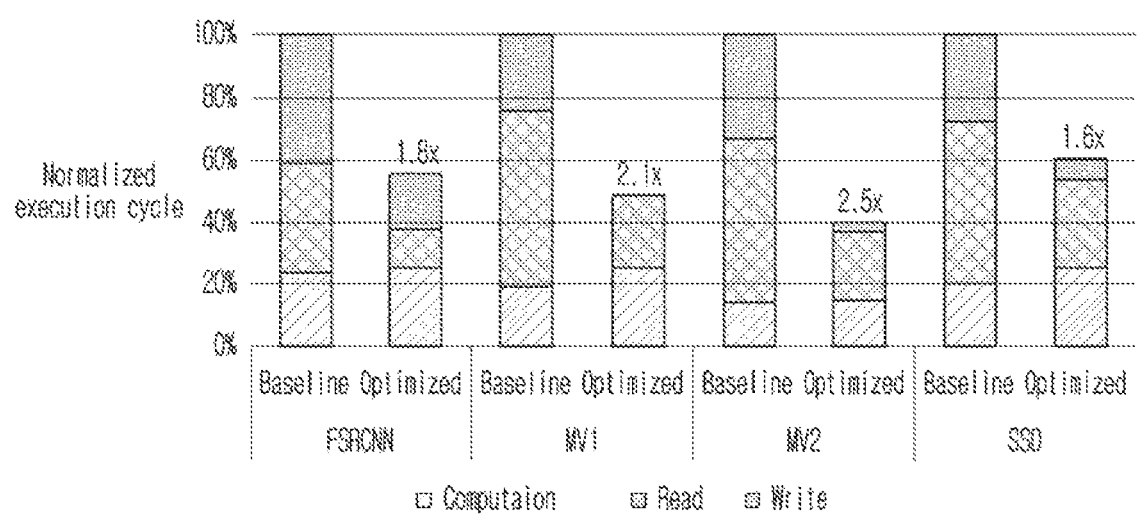
FIGS. 7 and 8 are graphs illustrating an effect according to the disclosure according to example embodiments.
Figure 8:
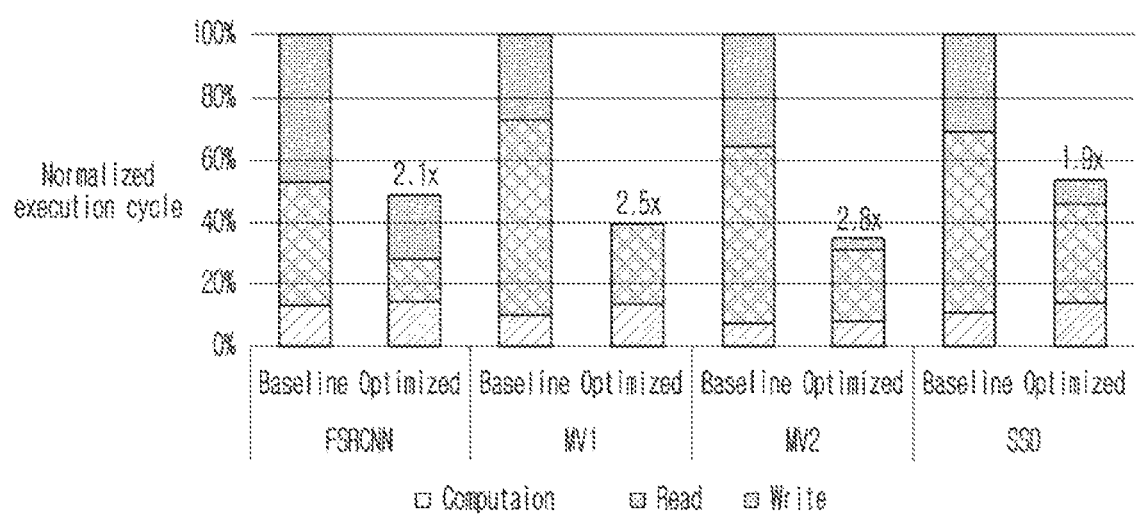

FIGS. 7 and 8 are graphs illustrating an effect according to the disclosure according to example embodiments.

Specifically, FIGS. 7 and 8 illustrates a graph of comparing an execution time of a result of performing a computation of the CNN according to a baseline and an execution time of a result of performing a computation of the CNN according to the disclosure (optimized). Here, the baseline may refer to a layer-by-layer execution method in which each computation of a plurality of layers is performed one by one. An experiment for deriving the results according to FIGS. 7 and 8 have all been performed through the NPU simulator, and measured by dividing an execution cycle of computation, memory 110 read, and memory 110 write. FIG. 7 illustrates an execution time when the memory 110 bandwidth is 4 GB/s, and FIG. 8 illustrates an execution time when the memory 110 bandwidth is 2 GB/s.

Referring to FIGS. 7 and 8, when a computation of the convolutional neural network is performed according to the disclosure, compared to the case of performing a computation of the convolutional neural network according to the baseline, when the memory 110 bandwidth is 4 GB/s, it shows a 1.97 times improvement in performance, and when the memory 110 bandwidth is 2 GB/s, it shows a 2.3 times improvement in performance. An optimization according to the disclosure is particularly effective in an Internet of things (IoT) environment or a mobile environment in which the memory 110 bandwidth is small.

As a result of the experiment, the memory 110 read and the memory 110 write corresponding to off-chip memory transfer are reduced by 42% and 20%, respectively, compared to the baseline.

Consequently, according to the disclosure, not only data transmission between fused layers but also data transmission between unfused layers is optimized, such that off-chip memory transfer may be remarkably reduced, and thus a computational efficiency of the neural network accelerator 120 may be significantly improved.

Figure 9:
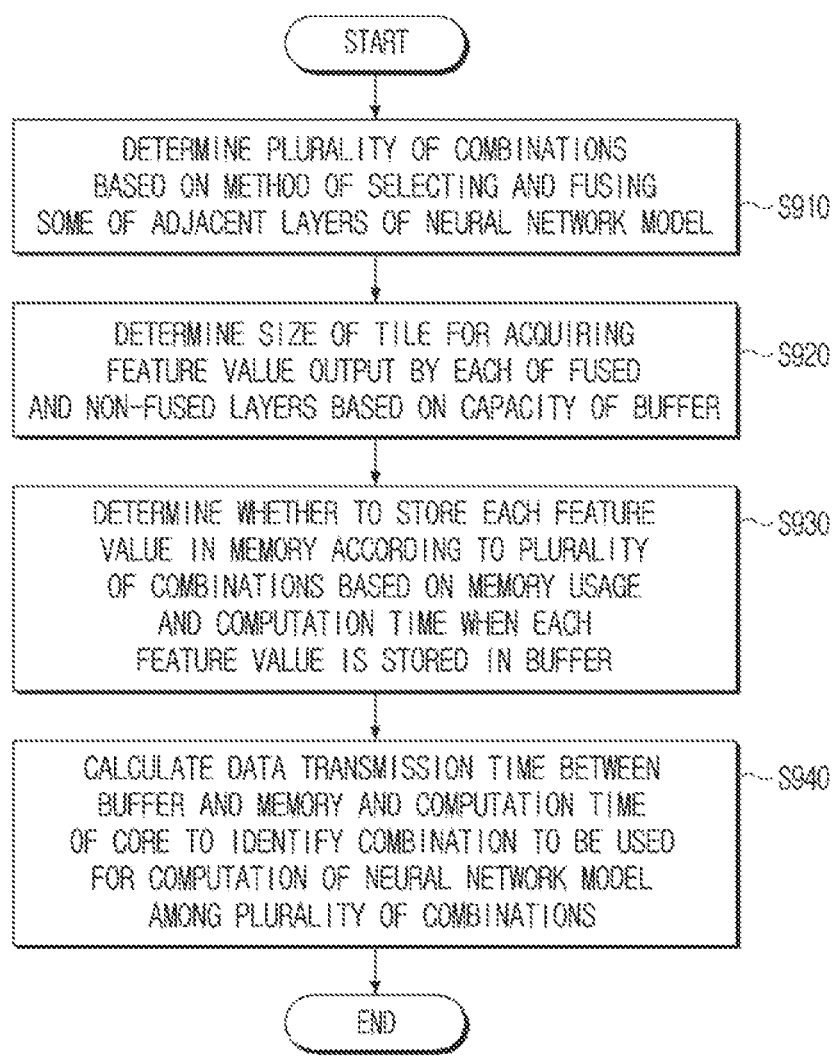
FIG. 9 is a flowchart illustrating a method of controlling an electronic apparatus according to an example embodiment.

FIG. 9 is a flowchart illustrating a method of controlling the electronic apparatus 100 according to an example embodiment.

Referring to FIG. 9, in operation S910, the electronic apparatus 100 may determine a plurality of combinations including fused layers and unfused layers based on a method of selecting and fusing some of adjacent layers of a neural network model.

Specifically, when two layers are fused, a computation result of a first layer may not be stored in the memory 110 but may be used by the next layer while stored in the buffer 121. For example, when the first layer and the second layer are fused, a first feature value output by the first layer may be stored in the buffer 121 and then input to the second layer without being stored in the memory 110. And, when the first feature value is input to the second layer, the second layer may acquire the second feature value based on the first feature value.

In operation S920, the electronic apparatus 100 may determine a size of a tile that can be processed in one computation by the core 122 for each of the plurality of combinations to acquire a feature value output by each of fused and non-fused layers based on the capacity of the buffer 121.

In an embodiment, when the memory usage 110 corresponding to a data size of the second feature value is less than the size of the buffer 121, the electronic apparatus 100 may determine a size of a tile to correspond to the data size of the second feature value. If the memory usage 110 corresponding to the data size of the second feature value is greater than the size of the buffer 121, the electronic apparatus 100 may determine the size of the tile to be less than the data size of the second feature value.

In operation S930, the electronic apparatus 100 may determine whether to store each feature value in the memory 110 according to a plurality of combinations based on the memory usage and computation time when each feature value is stored in the buffer 121.

For example, assuming that the second feature value output by the second layer is stored in the buffer 121, if the memory usage 110 to perform a computation of the second layer is less than a remaining capacity of the buffer 121, if the memory usage 110 to perform each computation of at least one layer using the second feature value is less than the remaining capacity of the buffer 121, and if a computation time for acquiring the second feature value is less than a case when the second feature value is stored in the memory 110, the electronic apparatus 100 may determine that the second feature value is stored in the buffer 121 and not stored in the memory 110.

In operation S940, the electronic apparatus 100 may calculate a data transmission time between the buffer 121 and the memory 110 and a computation time of the core 122 based on whether to store the determined size of the tile and each feature value in the memory 110 to identify a combination to be used for computation of the neural network model among the plurality of combinations.

Specifically, when a size of a tile with respect to each of the plurality of layers for each of the plurality of combinations, and whether to cache a feature value according to the disclosure are determined, the electronic apparatus 100 may calculate a data transmission time (i.e., off-chip memory transfer) between the buffer 121 and the memory 110 for each of the plurality of combinations, and the computation time of the core 122. In addition, the electronic apparatus 100 may identify a combination in which a sum of the data transmission time between the buffer 121 and the memory 110, and the computation time of the core 122 is a minimum among the plurality of combinations as an optimal combination.

The controlling method of an electronic apparatus according to the above-described various exemplary embodiments may be realized as a program and provided in a display apparatus or an input apparatus. Particularly, the program including a method for controlling a display apparatus according to exemplary embodiments may be stored in a non-transitory computer readable medium and provided therein.

Specifically, a non-transitory computer-readable recording medium including a program for executing a control method of the electronic apparatus 100, a method for controlling an electronic apparatus including a memory for storing data with respect to a neural network model, and a neural network accelerator including a buffer for temporarily storing data with respect to the neural network model and a core for performing a computation on the neural network model based on data stored in the buffer, the method includes determining a plurality of combinations including fused layers and non-fused layers based on a method of selecting and fusing some of adjacent layers of the neural network model, based on a capacity of the buffer, determining a size of a tile capable of being processed in one computation in the core to acquire a feature value output by each of the fused layers and non-fused layers according to the plurality of combinations, based on a memory usage and computation time in case of storing the respective feature values in the buffer, determining whether to store the respective feature values in the memory according to the plurality of combinations, and based on whether to store the determined size of the tile and the respective feature values in the memory, calculating a data transmission time between the buffer and the memory and computation time of the core according to the plurality of combinations to identify a combination to be used in a computation of the neural network model among the plurality of combinations.

In the above, the method for controlling the electronic apparatus 100 and a computer-readable recording medium including a program for executing the method for controlling the electronic apparatus 100 have been briefly described, but this is only for omitting redundant description, and various embodiments of the electronic apparatus 100 may be applied to the method for controlling the electronic apparatus 100 and the computer-readable recording medium including the program for executing the control method of the electronic apparatus 100.

Functions related to the neural network model as described above may be performed through the memory 110 and the processor 130.

The processor 130 may include one or more processors 130. In this case, one or a plurality of processors 130 may be a general-purpose processor 130, such as a CPU, AP, or the like, a graphics-only processor 130 such as a GPU, a vision processing unit (VPU), or the like, or an artificial intelligence-only processor 130 such as an NPU.

The one or more processors 130 control to process input data according to a predefined operation rule or artificial intelligence model stored in the non-volatile memory 110 and the volatile memory 110. The predefined operation rule or artificial intelligence model is characterized in that it is generated through learning.

Here, being generated through learning means that a predefined operation rule or artificial intelligence model of a desired feature is generated by applying a learning algorithm to a plurality of learning data. Such learning may be performed in the device itself on which the artificial intelligence according to the disclosure is performed, or may be performed through a separate server/system.

The artificial intelligence model may be composed of a plurality of neural network layers. Each layer may have a plurality of weight values, and a layer operation may be performed through an operation of a previous layer and the operation of the plurality of weights. Examples of neural networks may include a CNN, a DNN, a RNN, a restricted Boltzmann machine (RBM), a deep belief network (DBN), a bidirectional recurrent DNN (BRDNN) and a deep Q-network, and the neural network in the disclosure is not limited to the example described above, except as otherwise specified.

The learning algorithm is a method of training a predetermined target device (e.g., a robot) using a plurality of learning data such that the predetermined target device can make a decision or make a prediction by itself. Examples of the learning algorithm include supervised learning, unsupervised learning, semi-supervised learning, or reinforcement learning, and the learning algorithm in the disclosure is not limited, except as otherwise specified.

The machine-readable storage media may be provided in a form of a non-transitory storage media. The 'non-transitory' means that the storage media does not include a signal (e.g., electromagnetic wave) and is tangible, but does not distinguish whether data is stored semi-permanently or temporarily in the storage media. For example, the 'non-transitory storage media may include the buffer 121 in which data is temporarily stored.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product (e.g., downloadable app) may be at least temporarily stored or provisionally generated on the storage media such as a manufacturer's server, the application store's server, or a memory 110 in a relay server.

Further, each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration.

Operations performed by a module, a program module, or other component, according to various exemplary embodiments, may be sequential, parallel, or both, executed iteratively or heuristically, or at least some operations may be performed in a different order, omitted, or other operations may be added.

The term "module" as used herein includes units made up of hardware, software, or firmware, and may be used interchangeably with terms such as logic, logic blocks, components, or circuits. A "module" may be an integrally constructed component or a minimum unit or part thereof that performs one or more functions. For example, a module may be composed of application-specific integrated circuit (APIC).

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions, and may include the electronic apparatus (e.g., electronic apparatus 100) according to the disclosed embodiments.

When the instructions are executed by a processor, the processor may directory perform functions corresponding to the instructions using other components or the functions may be performed under a control of the processor. The instructions may include code generated or executed by a compiler or an interpreter.

The foregoing exemplary embodiments and advantages are merely exemplary and are not to be construed as limiting the disclosure. The present disclosure may be readily applied to other types of apparatuses. Also, the description of the exemplary embodiments of the disclosure is intended to be illustrative, and not to limit the scope of the claims, and many alternatives, modifications, and variations will be apparent to those skilled in the art.

What is claimed is:

1. An electronic apparatus comprising:
memory configured to store data corresponding to a neural network model;
a neural network accelerator comprising:
a buffer configured to temporarily store the data corresponding to the neural network model, and
a core configured to perform a computation on the neural network model based on the data stored in the buffer; and
at least one processor configured to:
determine a plurality of combinations comprising fused layers and non-fused layers based on a method of selecting and fusing adjacent layers of the neural network model,
based on a capacity of the buffer, determine a size of a tile capable of being processed in one computation in the core to acquire feature values output by the fused layers and the non-fused layers,
based on a first memory usage and computation time for storing the feature values in the buffer, determine whether to store the feature values in the memory,
based on determining the size of the tile and determining to store the feature values in the memory, identify a first combination among the plurality of combinations to be used in a computation of the neural network model by:
calculating a data transmission time between the buffer and the memory, and
calculating a computation time of the core,
convert the data corresponding to the neural network model into a first graph of a predetermined form,
convert the first graph into a second graph corresponding to the first combination, and
based on the second graph, generate code in which the data corresponding to the neural network model can be processed in the neural network accelerator.

2. The electronic apparatus of claim 1, wherein the fused layers comprise a first layer and a second layer adjacent to the first layer,
wherein a first feature value output by the first layer is configured to be stored in the buffer and input to the second layer without storing in the memory,
wherein a second feature value output by the second layer is configured to be acquired based on the first feature value, wherein, based on the second feature value being determined not to be stored in the memory, the second feature value is configured to be stored in the buffer and input to a third layer, and
wherein, based on the second feature value being determined to be stored in the memory, the second feature value is configured to be stored in the memory and input to the third layer.

3. The electronic apparatus of claim 2, wherein the size of the tile and a data size of the second feature value are configured to be determined according to a number of rows, a number of columns, a depth of a matrix representing the tile and the second feature value.

4. The electronic apparatus of claim 3, wherein the at least one processor is further configured to:
determine, based on a second memory usage corresponding to the data size of the second feature value being less than a size of the buffer, the size of the tile to correspond to the data size of the second feature value, and
determine, based on the second memory usage corresponding to the data size of the second feature value being greater than the size of the buffer, the size of the tile to a size less than the data size of the second feature value.

5. The electronic apparatus of claim 4, wherein the at least one processor is configured to:
determine whether to store the second feature value in the buffer or not to store the second feature value in the memory, based on the second feature value being stored in the buffer, based on a third memory usage required to perform a computation of the second layer being less than a remaining capacity of the buffer, based on a fourth memory usage required to perform a computation of each of at least one layer using the second feature value being less than the remaining capacity of the buffer, and based on a computation time for acquiring the second feature value being less than the second feature value being stored in the memory.

6. The electronic apparatus of claim 1, wherein the at least one processor is further configured to:
identify the first combination as a combination in which a sum of the data transmission time between the buffer and the memory, and the computation time of the core among the plurality of combinations is a minimum.

7. A method for controlling an electronic apparatus, the electronic apparatus comprising memory configured to store data corresponding to a neural network model, and a neural network accelerator comprising a buffer configured to temporarily store the data corresponding to the neural network model and a core configured to perform a computation on the neural network model based on the data stored in the buffer, and the method comprising:
determining a plurality of combinations comprising fused layers and non-fused layers based on a method of selecting and fusing adjacent layers of the neural network model;
based on a capacity of the buffer, determining a size of a tile capable of being processed in one computation in the core to acquire feature values output by the fused layers and the non-fused layers;
based on a first memory usage and computation time for storing the feature values in the buffer, determining whether to store the feature values in the memory;
based on determining the size of the tile and determining to store the feature values in the memory, identifying a first combination among the plurality of combinations to be used in a computation of the neural network model by:
  calculating a data transmission time between the buffer and the memory, and
  calculating a computation time of the core according to the plurality of combinations
converting the data corresponding to the neural network model into a first graph of a predetermined form;
converting the first graph into a second graph corresponding to the first combination; and
based on the second graph, generating code in which the data corresponding to the neural network model can be processed in the neural network accelerator.

8. The method of claim 7, wherein the fused layers comprise a first layer and a second layer adjacent to the first layer,
  wherein a first feature value output by the first layer is configured to be stored in the buffer and input to the second layer without storing in the memory,
  wherein a second feature value output by the second layer is configured to be acquired based on the first feature value,
  wherein, based on the second feature value being determined not to be stored in the memory, the second feature value is configured to be stored in the buffer and input to a third layer, and
  wherein, based on the second feature value being determined to be stored in the memory, the second feature value is configured to be stored in the memory and input to the third layer.

9. The method of claim 8, wherein the size of the tile and a data size of the second feature value are configured to be determined according to a number of rows, a number of columns, a depth of a matrix representing the tile and the second feature value.

10. The method of claim 9, wherein the determining the size of the tile comprises:
  determining, based on a second memory usage corresponding to the data size of the second feature value being less than a size of the buffer, the size of the tile to correspond to the data size of the second feature value; and
  determining, based on the second memory usage corresponding to the data size of the second feature value being greater than the size of the buffer, the size of the tile to a size less than the data size of the second feature value.

11. The method of claim 10,
  wherein the determining whether to store the feature value in the memory comprises determining whether to store the second feature value in the buffer or not to store the second feature value in the memory, based on the second feature value being stored in the buffer, based on a third memory usage required to perform a computation of the second layer being less than a remaining capacity of the buffer, based on a fourth memory usage required to perform a computation of each of at least one layer using the second feature value being less than the remaining capacity of the buffer, and based on a computation time for acquiring the second feature value being less than the second feature value being stored in the memory.

12. The method of claim 7, wherein the identifying the first combination comprises identifying the first combination as a combination in which a sum of the data transmission time between the buffer and the memory, and the computation time of the core among the plurality of combinations is a minimum.

13. A non-transitory computer-readable storage medium storing instructions that, when executed by at least one processor of an electronic apparatus, the electronic apparatus comprising:
  memory configured to store data corresponding to a neural network model; and
  a neural network accelerator comprising a buffer configured to temporarily store the data corresponding to the neural network model and a core configured to perform a computation on the neural network model based on the data stored in the buffer,
  cause the at least one processor to:
    determine a plurality of combinations comprising fused layers and non-fused layers based on a method of selecting and fusing adjacent layers of the neural network model;
    based on a capacity of the buffer, determine a size of a tile capable of being processed in one computation in the core to acquire feature values output by the fused layers and the non-fused layers;
    based on a first memory usage and computation time for storing the feature values in the buffer, determine whether to store the feature values in the memory;
    based on determining the size of the tile and determining to store the feature values in the memory, identify a first combination among the plurality of combinations to be used in a computation of the neural network model by:
      calculating a data transmission time between the buffer and the memory, and
      calculating a computation time of the core according to the plurality of combinations,
    convert the data corresponding to the neural network model into a first graph of a predetermined form,
    convert the first graph into a second graph corresponding to the first combination, and
    based on the second graph, generate code in which the data corresponding to the neural network model can be processed in the neural network accelerator.

14. The storage medium of claim 13, wherein the fused layers comprise a first layer and a second layer adjacent to the first layer,
  wherein a first feature value output by the first layer is configured to be stored in the buffer and input to the second layer without storing in the memory,
  wherein a second feature value output by the second layer is configured to be acquired based on the first feature value,
  wherein, based on the second feature value being determined not to be stored in the memory, the second feature value is configured to be stored in the buffer and input to a third layer, and
  wherein, based on the second feature value being determined to be stored in the memory, the second feature value is configured to be stored in the memory and input to the third layer.

15. The storage medium of claim 14, wherein the size of the tile and a data size of the second feature value are configured to be determined according to a number of rows, a number of columns, a depth of a matrix representing the tile and the second feature value.

16. The storage medium of claim 15, wherein the instructions, when executed, cause the at least one processor to determine the size of the tile by:

determining, based on a second memory usage corresponding to the data size of the second feature value being less than a size of the buffer, the size of the tile to correspond to the data size of the second feature value; and determining, based on the second memory usage corresponding to the data size of the second feature value being greater than the size of the buffer, the size of the tile to a size less than the data size of the second feature value.

17. The storage medium of claim 16, wherein the instructions, when executed, cause the at least one processor to determine whether to store the feature value in the memory by determining whether to store the second feature value in the buffer or not to store the second feature value in the memory, based on the second feature value being stored in the buffer, based on a third memory usage required to perform a computation of the second layer being less than a remaining capacity of the buffer, based on a fourth memory usage required to perform a computation of each of at least one layer using the second feature value being less than the remaining capacity of the buffer, and based on a computation time for acquiring the second feature value being less than the second feature value being stored in the memory.

18. The storage medium of claim 13, wherein the instructions, when executed, cause the at least one processor to identify the first combination by identifying the first combination as a combination in which a sum of the data transmission time between the buffer and the memory, and the computation time of the core among the plurality of combinations is a minimum.

\* \* \* \* \*